No. 809,642. PATENTED JAN. 9, 1906.
C. W. THOMAS.
CENTRIFUGAL MACHINE FOR SCREENING PULP.
APPLICATION FILED APR. 8, 1904.

3 SHEETS—SHEET 2.

WITNESSES:
Gustave Dieterich.
Edwin H. Dieterich.

INVENTOR
Charles W. Thomas
BY
Chas. C. Gill
ATTORNEY

No. 809,642. PATENTED JAN. 9, 1906.
C. W. THOMAS.
CENTRIFUGAL MACHINE FOR SCREENING PULP.
APPLICATION FILED APR. 8, 1904.
3 SHEETS—SHEET 3.
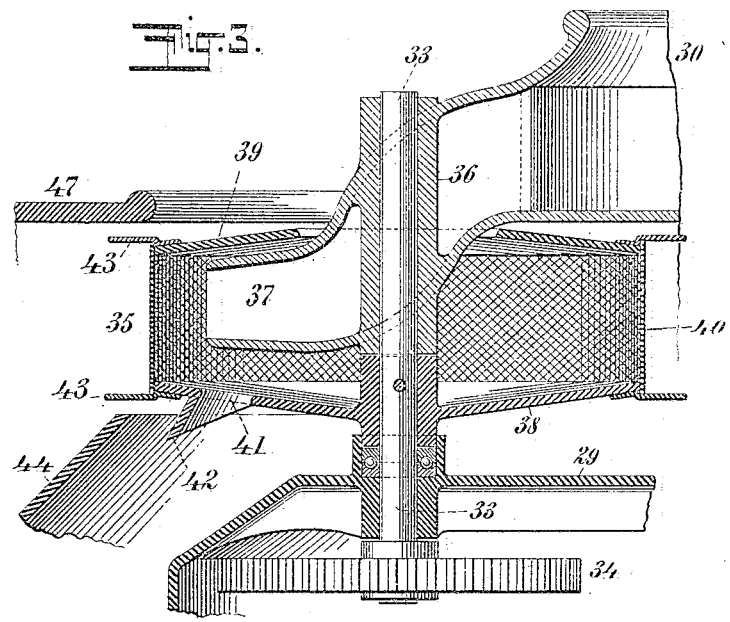
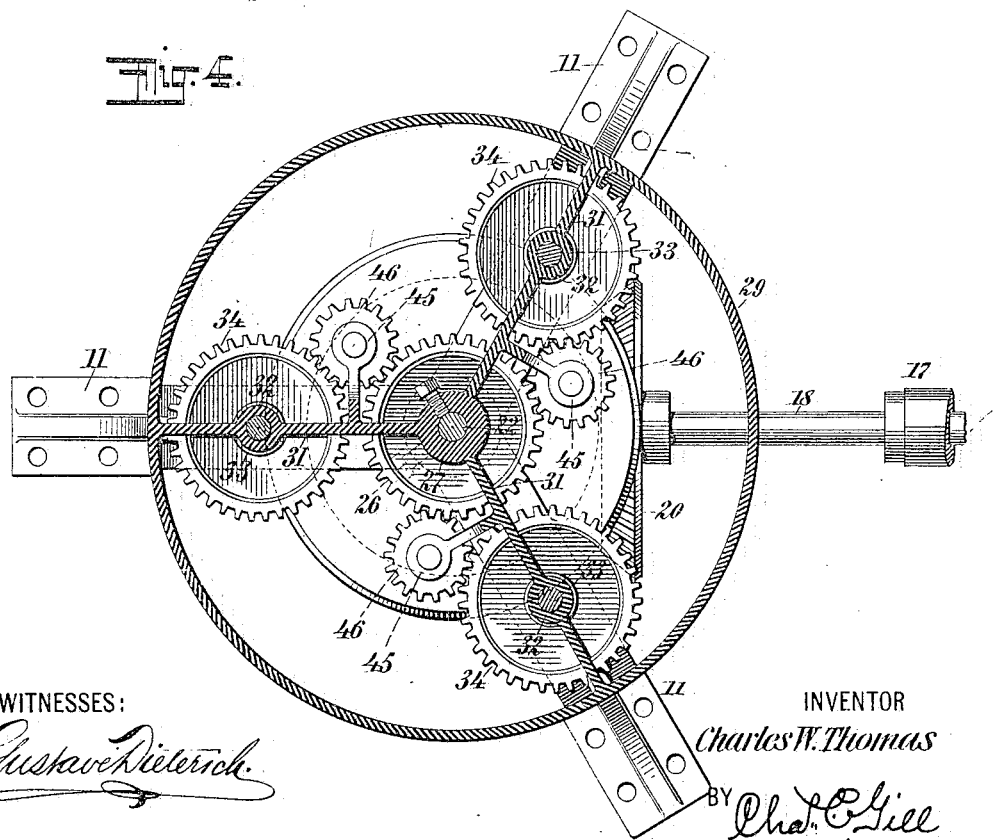
WITNESSES:
Gustave Dieterich
Edwin H. Dieterich
INVENTOR
Charles W. Thomas
BY Chas. E. Gill
ATTORNEY

UNITED STATES PATENT OFFICE.

CHARLES W. THOMAS, OF NUTLEY, NEW JERSEY, ASSIGNOR OF ONE-HALF TO CHARLES SMITH, OF BELLEVILLE, NEW JERSEY.

CENTRIFUGAL MACHINE FOR SCREENING PULP.

No. 809,642.     Specification of Letters Patent.     Patented Jan. 9, 1906

Application filed April 8, 1904. Serial No. 202,203.

*To all whom it may concern:*

Be it known that I, CHARLES W. THOMAS, a citizen of the United States, and a resident of Nutley, in the county of Essex and State of New Jersey, have invented certain new and useful Improvements in Centrifugal Machines for Screening Ground Wood, Sulfite, and other Materials, of which the following is a specification.

The invention relates to improvements in centrifugal screens for ground wood, sulfite, and other materials; and it consists in the novel features, arrangements, and combinations of parts hereinafter described, and particularly pointed out in the claims.

The object of the invention is to provide a more efficient, convenient, reliable, and rapid means for screening, and to this end I produce a machine having a rotary feed-hopper to primarily receive the ground wood and water and having a series of spouts or pipes leading radially therefrom, a series of rotary cylindrical vessels into which said spouts deliver and which have perforated walls to act as screens, means for rotating said hopper and vessels and imparting to said vessels while rotating a planetary or revolving motion around the central axis of said hopper, a circular inclosing chamber to receive the material which passes through said screens, and means for receiving the material which does not pass through the said screens, but descends through the bottoms of said vessels.

The invention will be more fully understood from the detailed description hereinafter presented, reference being had to the accompanying drawings, in which—

Figure 1:
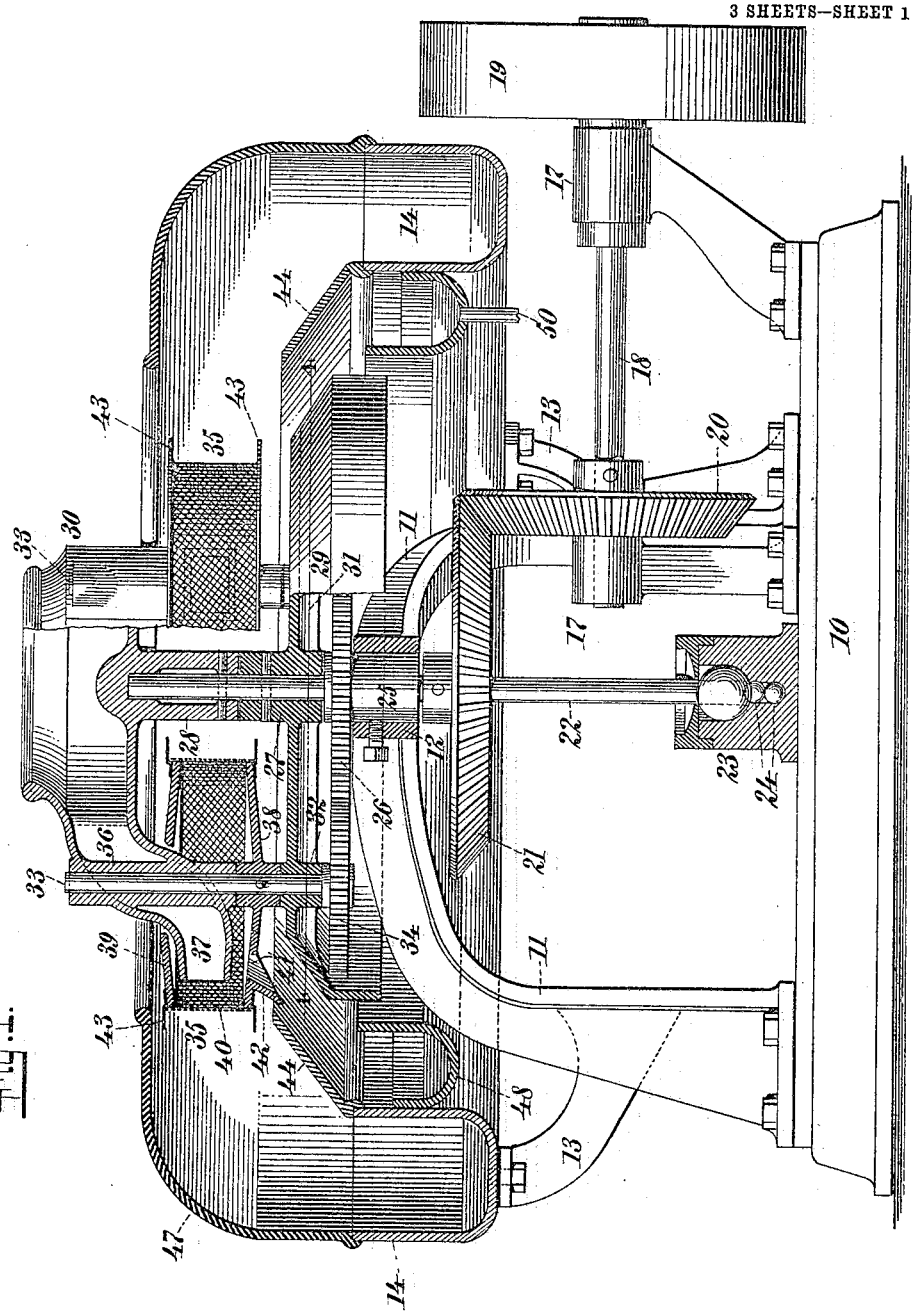
Figure 2:
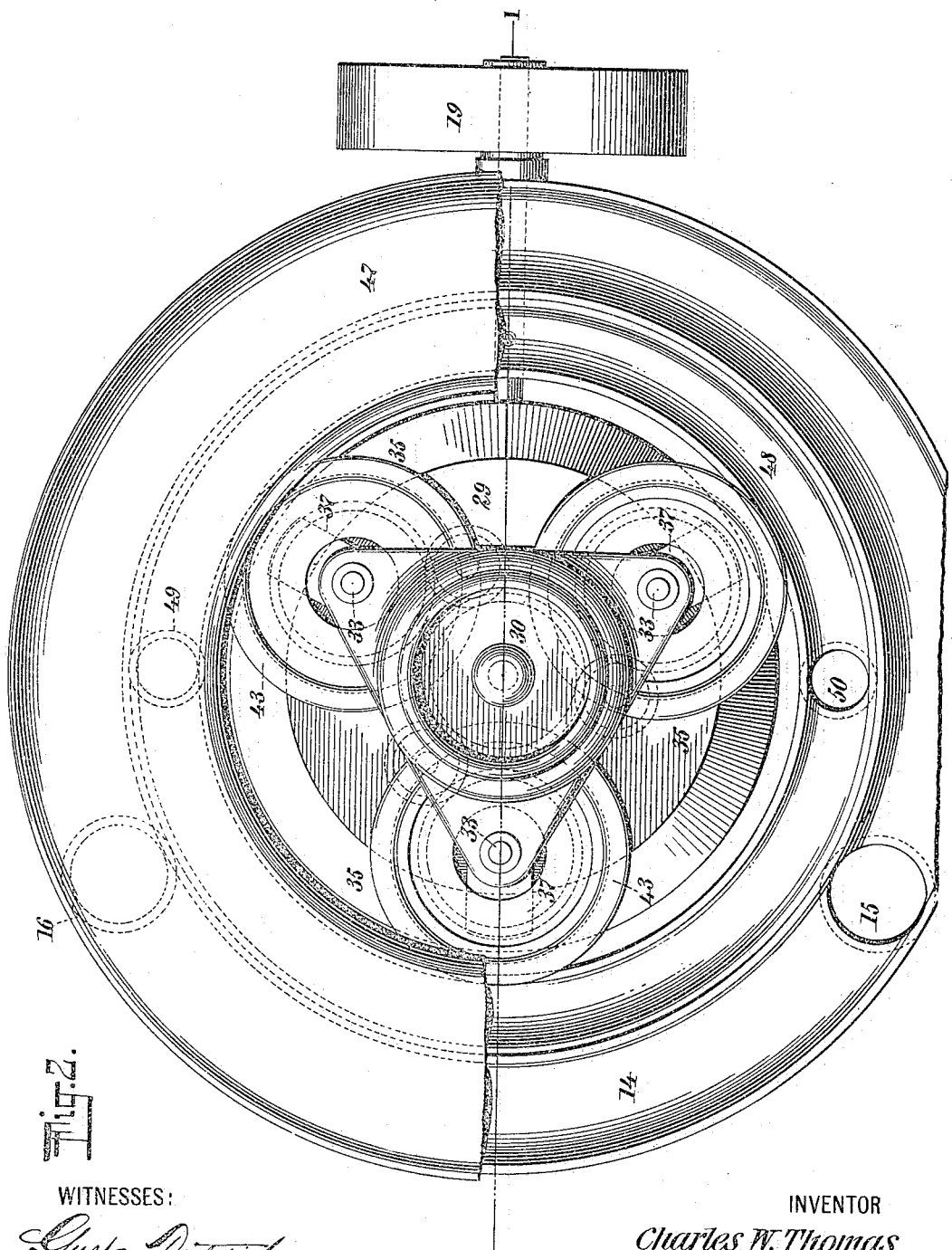

Figure 1 is a side elevation, partly broken away and partly in section, on the dotted line 1 1 of Fig. 2, of a machine constructed in accordance with and embodying the invention. Fig. 2 is a top view, a part of the covering-cap being broken away, of same. Fig. 3 is an enlarged vertical section through a portion of the machine on the left-hand portion of the dotted line 1 1 of Fig. 2, and Fig. 4 is a horizontal section through a portion of the machine on the dotted line 4 4 of Fig. 1.

In the drawings, 10 designates a suitable base for the machine, and upon this base 10 is mounted a suitable skeleton supporting-frame 11, affording a central vertical sleeve 12 and having bracket-arms 13 to receive and support a circular horizontal trough 14, having an open upper end and provided in its base with openings 15 16, Fig. 2, one of which may be connected with a delivery-pipe and the other of which may be connected with a pipe (not shown) for supplying water to the trough for aiding in cleaning out the latter or other purposes. The base 10 also affords a support for the bearings 17 for the driving-shaft 18, which is supplied on its outer end with a suitable belt-wheel 19 and has secured upon its inner end a bevel gear-wheel 20, which meshes with a corresponding gear-wheel 21, secured upon the vertical shaft 22, the latter receiving its motion from the shaft 18 through said gear-wheels 20 21. The lower end of the vertical shaft 22 is in the form of or has secured upon it a ball and is mounted within a suitable bearing-block 23 upon balls 24, as shown in Fig. 1. The shaft 22 extends upwardly through the hub 25 of a stationary central gear-wheel 26 and has secured upon its upper portion the hubs 27 and 28 of the horizontal frame 29 and hopper 30, respectively, which frame and hopper rotate with said shaft 22. The frame 29 is in the form of a circular horizontal plate having a depending peripheral flange which imparts to the frame 29 the appearance and functions of a hood shielding the series of gear-wheels, hereinafter described, carried by said frame. The frame 29 has on its lower surface a series of integral vertical flanges 31 and hubs 32, Figs. 1, 3, and 4, in which hubs are mounted vertical spindles or shafts 33, carrying upon their lower ends the gear-wheels 34, which are equidistant from each other and all of the same size. The spindles 33 have secured upon them the rotary screen vessels 35, and said spindles extend upwardly through the sleeves 36, which may be integral with the branch pipes or spouts 37, leading from the hopper 30. The vessels 35 each comprise the bottom section 38, a top section 39, and perforated side walls 40, the top section 39 being open at its central portion to receive the spout 37 and spindle 33 and the bottom section 38 being open, as at 41, to permit the automatic discharge of such substances as may not pass through the perforated walls 40, the opening 41 of each vessel 35 being provided at its outer edge with a lip or inclined flange 42 to prevent any of the material passing through said opening from reaching the trough 14. The top and bottom sections of the vessels 35 will also be provided with annular horizontal projecting flanges 43 for directing all material (passing through the perforated walls 40) over the upper edge of the inclined circular plate 44, which rests upon the inner upper edges of the trough 14 and inclines upwardly and inwardly to a point between the openings 41 and outer edges of the flanges 43 of the vessels 35, as shown. The vessels 35 are at their lower central portions fastened to the spindles or shafts 33, and hence rotate with said shafts, and the lower ends of the hub portions of said vessels 35 are mounted upon suitable bearings upon the frame 29 and over the hubs 32 of said frame. The vessels 35 rotate with the shafts 33, and are at the same time given a planetary movement, due to the rotation of the frame 29 and the fact that said frame carries said rotary shafts or spindles 33.

The flanges 31 at the lower side of the frame 29 are formed, as shown in Fig. 4, with bracket-arms 45, which afford bearings for the intermediate pinion-wheels 46, which are always in mesh with the stationary gear-wheel 26 and rotary gear-wheels 34. The said pinion-wheels 46 all engage the gear-wheel 26, and each engages one of the gear-wheels 34. The pinion-wheels 46 derive their movement from the fact that they are carried by the frame 29 and that said frame when in rotation carries said pinion-wheels against the teeth of the central stationary gear-wheel 26, and the pinion-wheels 46 during the rotation of the frame 29 impart rotary motion to the gear-wheels 34 and spindles 33, the latter thus being able to rotate the screen vessels 35, while at the same time said vessels are having a revolving motion imparted to them around the central vertical axis of the machine.

The hopper 30 is an open receptacle secured, as shown in Fig. 1, upon the upper end of the vertical shaft 22 and having a series of radial downwardly and outwardly extending branch pipes or spouts 37 leading into the screen vessels 35 and arranged to deliver the material placed into the hopper 30 at a point between the spindles 33 and the outer wall of said vessels 35, it being the purpose that the discharge ends of said spouts shall be sufficiently close to the outer perforated walls of the vessels 35 to compel the delivery of the material from said spouts directly against the inner surface of the outer portions of said walls 40.

Upon the upper edges of the outer sides of the trough 14 is mounted the shell or cap 47, which is in the nature of a hood inclosing the trough 14 and as much of the top of the machine as may be required, it being desirable that the cap 47 shall extend slightly inwardly over the outer edges of the screen vessels 35.

I provide a circular trough 48 intermediate the trough 14 and the frame 29, this trough being to receive such materials as may be discharged from the openings 41 in the bottoms of the screen vessels 35. The trough 48 will be provided with the outlet-opening 49, Fig. 2, and an inlet 50, through the latter of which water may be introduced for the purpose of washing out said trough.

In the operation of the machine the ground wood, sulfite, or other material in their usual condition for screening will be fed into the hopper 30, and the operative parts of the machine will be set in motion by power applied to the driving-shaft 18. The ground wood or sulfite, with the water, will flow downwardly through the spouts 37 and be delivered to the screen vessels 35, the said material being at all times projected against the inner surfaces of the outer perforated walls 40 of said vessels. During the operation of the machine the frame 29 is in continuous rotation and carries the vessels 35 and spouts 37 around with it upon the line of a circle of which the vertical shaft 22 represents the center. During the rotation of the frame 29 the vessels 35 have imparted to them through the gear-wheels 26, 46, and 34 an independent rotation upon their own axes in a direction reversely to that of the frame 29, whereby the vessels 35 during the operation of the machine have both an independent rotary motion and a planetary motion imparted to them, with the result of very greatly increasing the efficiency of the perforated walls 40 in screening the material and of producing a machine of great capacity. The hopper 30 rotates with the vertical shaft 22 and frame 29, and hence the spouts 37 always maintain their due relation to the outer portions of the vessels 35; but since said vessels 35 have a rotary as well as a planetary movement the perforated walls of said vessels are constantly traveling by the discharge ends of the spouts 37, whereby fresh surfaces of said walls 40 are constantly presented to said spouts and the entire perforated walls 40 efficiently utilized. The fact that the walls 40 do constantly pass by the discharge ends of the spouts 37 is also important, since thereby any danger of a sliver of wood being projected through the meshes or apertures of the walls 40 is reduced to a minimum. The best results are attained when the screen vessels 35 rotate reversely to the direction of their revolving motion, since thereby and without unduly rapid rotation said vessels present fresh surfaces to the discharge-spouts 37 and the material within said vessels is by the main centrifugal action, due to the revoluble motion of the vessels, thrown to that side thereof which has just passed beyond said spouts instead of against that side of the vessels just approaching the said spouts to receive the material therefrom, whereby the efficiency and capacity of the machine is increased, since the perforated surfaces approaching the said spouts are in proper condition to receive the fresh material and to efficiently perform their work, which would not so assuredly be the case if the material within the vessels had by the said main centrifugal action been thrown upon said surfaces as they were approaching said spouts and the latter had to deliver material directly against surfaces thus already covered over. The spouts 37 are arranged to deliver the material directly against the perforated side walls of the vessels 35 and in a fixed direction with relation to said vessels, since by their movement they travel with said vessels during the revolving motion of the latter. During the operation of the machine when the perforated wall of a rotating vessel 35 is passing, for illustration, toward the right beyond a spout 37 the material within the vessel is by the main centrifugal action also thrown toward the right, leaving the left-hand or approaching surface of the vessel in proper condition to receive the material from said spout.

I have designed the machine described hereinbefore for use in the manufacture of paper, and hence the machine is represented more especially for screening ground wood and sulfite, the material in proper condition for use passing through the perforated walls 40 of the vessels 35 and the slivers, refuse, &c., discharging through the openings 41 in the bottoms of the vessels 35 and being thrown outwardly into the trough 48.

I do not limit the invention to all of the details of form and construction illustrated, since these will vary somewhat with individual judgment and the nature of the material to be subjected to the action of the machine.

What I claim as my invention, and desire to secure by Letters Patent, is—

1. In a machine of the character described, a series of vertical cylindrical screen vessels having perforated side walls, means for revolving said vessels around a central vertical axis, means for rotating said vessels on their own independent axes in a direction reversely to that of their revolving motion, and means for delivering the material to be screened to said vessels and directly against the perforated side walls of same and in a fixed direction with relation to said vessels so that as said material is thus delivered the said vessels present new surfaces to receive the same and the material within the vessels is thrown, by the main centrifugal action, to that side thereof which has just passed from said delivery means, combined with means for receiving the material which passes through said perforated walls; substantially as set forth.

2. In a machine of the character described, the series of discharge-spouts leading from a source of supply of the material to be screened, and a series of vertical cylindrical screen vessels having perforated side walls and openings in their upper and lower ends, said spouts passing directly into said vessels and into approximately near relation to the side walls of same and having their discharge ends pointed to said perforated side walls so as to deliver the material directly against the same, combined with means for revolving said vessels around a central vertical axis, means for rotating said spouts to follow said vessels, means for rotating said vessels on their own independent axes so that they may present new surfaces to said discharge-spouts, and means for receiving the material which passes through said perforated side walls; substantially as set forth.

3. In a machine of the character described, a vertical rotary shaft 22, a horizontal frame 29 to be rotated thereby, a series of gear-wheels 34 and vertical spindles 33 carried by said frame, a central stationary gear-wheel 26, and the series of intermediate pinion-wheels 46 connecting said gear-wheels 34 with said gear-wheel 26, combined with the screen vessels secured to said spindles 33 and having perforated side walls, means for supplying said vessels with the material to be screened, and means for imparting motion to said shaft 22; substantially as set forth.

4. In a machine of the character described, a vertical rotary shaft 22, a horizontal frame 29 to be rotated thereby, a series of gear-wheels 34 and vertical spindles 33 carried by said frame, a central stationary gear-wheel 26, and the series of intermediate pinion-wheels 46 connecting said gear-wheels 34 with said gear-wheel 26, combined with the screen vessels secured to said spindles 33 and having perforated side walls, the rotary feed-hopper connected with said shaft and having the radial spouts to discharge into said vessels, and means for imparting motion to said shaft 22; substantially as set forth.

5. In a machine of the character described, a horizontal rotary frame 29, a series of gear-wheels 34 and vertical spindles 33 carried by said frame, a central stationary gear-wheel 26, and the series of intermediate pinion-wheels 46 connecting said gear-wheels 34 with said gear-wheel 26, combined with the screen vessels secured to said spindles 33 and having perforated side walls, means for supplying said vessels with the material to be screened, and means for imparting rotary motion to said frame; substantially as set forth.

6. In a machine of the character described, a horizontal rotary frame 29, a series of gear-wheels 34 and vertical spindles 33 carried by said frame, a central stationary gear-wheel 26, and the series of intermediate pinion-wheels 46 connecting said gear-wheels 34 with said gear-wheel 26, combined with the screen vessels secured to said spindles 33 and having perforated side walls, means for supplying said vessels with the material to be screened, and means for imparting rotary motion to said frame, said means for supplying said vessels comprising a rotary feed-hopper having radial discharge-spouts leading directly into said vessels and terminating at one side of the center thereof in approximately near relation to the perforated walls of said vessels; substantially as set forth.

7. In a machine of the character described, the series of discharge-spouts leading from a source of supply of the material to be screened, a series of vertical cylindrical screen vessels having perforated side walls and each receiving the discharge from one of said spouts, means for revolving said vessels around a central vertical axis, means for rotating said spouts to follow said vessels, and means for rotating said vessels on their own independent axes in a direction reversely to that of their revolving motion, said spouts passing directly into said vessels and into approximately near relation to the side walls of same and having their discharge ends pointed to said perforated side walls so as to deliver the material directly against the same, combined with means for receiving the material which passes through said perforated walls; substantially as set forth.

8. In a machine of the character described, the series of spouts leading from a source of supply of the material to be screened, and a series of vertical cylindrical screen vessels having perforated side walls and each receiving the discharge from one of said spouts, said spouts being arranged to deliver the material directly against said perforated side walls, combined with means for revolving said vessels around a central vertical axis, means for rotating said spouts to follow said vessels, means for rotating said vessels on their own independent axes in a direction reversely to that of their revolving motion, means for receiving the material which passes through said perforated side walls, and means for receiving the material which fails to pass through said walls; substantially as set forth.

9. In a machine of the character described, a rotary frame 29, a series of gear-wheels 34 and spindles 33 carried by said frame, a central stationary gear-wheel 26, and the series of intermediate pinion-wheels 46 connecting said gear-wheels 34 with said gear-wheel 26, combined with the screen vessels secured to said spindles 33 and having perforated side walls, means for supplying said vessels with the material to be screened, and means for imparting rotary motion to said frame; substantially as set forth.

10. In a centrifugal pulp-screen, a central shaft, a series of individual screens mounted upon and revolving with said shaft, and means for revolving each of the series of individual screens upon its own axis, said means consisting of a stationary gear concentric with the central shaft, said stationary gear being operatively connected to the shafts of the individual screens by idler-gears located between the stationary gear and driving-gears on the individual shafts; substantially as described.

11. In a centrifugal machine for screening paper-pulp and the like, a vertical cylindrical screen vessel having an opening in its lower end and having perforated side walls, means for revolving said vessel around an axis exterior thereto, means for rotating said vessel on its own independent axis, and means for delivering the material to be screened to said vessel and directly against the vertical perforated side wall of same and in a fixed direction with relation to said vessel, whereby said vessel may constantly present new surfaces to receive said material, the perforations in said side walls being adapted to permit the good pulp only to pass through them, while the slivers and tailings escape through the lower end of said vessel; substantially as set forth.

12. In a centrifugal machine for screening paper-pulp and the like, a vertical cylindrical screen vessel having an opening in its lower end and having perforated side walls, means for revolving said vessel around an axis exterior thereto, means for rotating said vessel on its own independent axis in a direction reversely to that of its revolving motion, and means for delivering the material to be screened to said vessel and directly against the vertical perforated side wall of same and in a fixed direction with relation to said vessel, whereby said vessel may constantly present new surfaces to receive said material, the perforations in said side walls being adapted to permit the good pulp only to pass through them, while the slivers and tailings escape through the opening in the lower end of said vessel; substantially as set forth.

Signed at New York, in the county of New York and State of New York, this 31st day of March, A. D. 1904.

CHARLES W. THOMAS.

Witnesses:
CHAS. C. GILL,
ARTHUR MARION.